US012553310B2

(12) United States Patent
Inglis et al.

(10) Patent No.: US 12,553,310 B2
(45) Date of Patent: Feb. 17, 2026

(54) FIRE ON DEMAND BARRIER VALVE USING WIRELESS SIGNAL TRANSMISSION AND SPRING-FORCED PISTON

(71) Applicant: Halliburton Energy Services, Inc., Houston, TX (US)

(72) Inventors: Peter D W Inglis, Arbroath (GB); Michael Christie, Aberdeenshire (GB); Colin Reid, Aberdeenshire (GB)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/812,743

(22) Filed: Aug. 22, 2024

(65) Prior Publication Data

US 2025/0084726 A1 Mar. 13, 2025

Related U.S. Application Data

(60) Provisional application No. 63/537,124, filed on Sep. 7, 2023.

(51) Int. Cl.
*E21B 34/06* (2006.01)
*G08C 23/02* (2006.01)

(52) U.S. Cl.
CPC .............. *E21B 34/06* (2013.01); *G08C 23/02* (2013.01)

(58) Field of Classification Search
CPC .......... E21B 47/18; E21B 47/16; E21B 47/14; E21B 47/12; E21B 34/063; E21B 34/06; H04B 11/00; G08C 23/02; G08C 23/00
See application file for complete search history.

(56) References Cited

U.S. PATENT DOCUMENTS

| | | | |
|---|---|---|---|
| 6,148,915 | A | 11/2000 | Mullen et al. |
| 6,328,119 | B1 | 12/2001 | Gillis et al. |
| 7,380,609 | B2 | 6/2008 | Page et al. |
| 8,230,913 | B2 | 7/2012 | Hart et al. |
| 8,397,804 | B2 | 3/2013 | Hart et al. |
| RE45,011 | E | 7/2014 | Schetky et al. |
| 8,776,876 | B2 | 7/2014 | Hart et al. |
| RE45,099 | E | 9/2014 | Schetky et al. |

(Continued)

FOREIGN PATENT DOCUMENTS

WO 2014100271 6/2014

OTHER PUBLICATIONS

International Search Report and Written Opinion for International Patent Application No. PCT/US2024/044053 dated Dec. 3, 2024. PDF file. 10 pages.

*Primary Examiner* — George S Gray
(74) *Attorney, Agent, or Firm* — Scott Richardson; C. Tumey Law Group PLLC

(57) ABSTRACT

Systems and methods include actuating a downhole tool. In some embodiments, the methods include the steps of providing a conductor having a first end positioned at a surface location and a second end positioned at a first downhole location within a wellbore, receiving an electrical signal from the conductor at the first downhole location, transmitting an acoustic signal through the wellbore, starting at the first downhole location and arriving at a second downhole location, receiving the acoustic signal at the second downhole location, and actuating the downhole tool from a first configuration to a second configuration by moving a spring-forced piston in response to the acoustic signal.

20 Claims, 8 Drawing Sheets

(56) References Cited

U.S. PATENT DOCUMENTS

| | | | |
|---|---|---|---|
| RE45,244 | E | 11/2014 | Schetky et al. |
| 9,045,962 | B2 | 6/2015 | Christie et al. |
| 9,260,934 | B2 | 2/2016 | Godfrey et al. |
| 9,657,550 | B2 | 5/2017 | Inglis et al. |
| 10,053,963 | B2 | 8/2018 | Hart et al. |
| 10,550,670 | B2 | 2/2020 | Hart et al. |
| 10,724,335 | B2 | 7/2020 | Ledingham et al. |
| 10,794,157 | B2 | 10/2020 | Kohn et al. |
| 10,961,818 | B2 | 3/2021 | Inglis et al. |
| 11,111,779 | B2 | 9/2021 | Inglis et al. |
| 11,125,078 | B2 | 9/2021 | Joseph et al. |
| 11,299,966 | B1 | 4/2022 | Krueger |
| 11,359,459 | B2 | 6/2022 | Davies et al. |
| 11,371,317 | B2 | 6/2022 | Inglis et al. |
| 11,441,392 | B2 | 9/2022 | Fripp et al. |
| 11,486,246 | B2 | 11/2022 | Fripp et al. |
| 11,506,009 | B2 | 11/2022 | Inglis et al. |
| 11,746,924 | B2 | 9/2023 | Wang et al. |
| 11,927,074 | B2 | 3/2024 | Inglis et al. |
| 12,044,102 | B1 | 7/2024 | Wallace et al. |
| 2007/0007014 | A1 | 1/2007 | Sessions et al. |
| 2008/0093090 | A1 | 4/2008 | Jaques et al. |
| 2012/0061095 | A1* | 3/2012 | Capderou ............. E21B 34/066 166/321 |
| 2012/0065897 | A1 | 3/2012 | Snider et al. |
| 2012/0125598 | A1 | 5/2012 | Godfrey et al. |
| 2013/0180706 | A1 | 7/2013 | Hart et al. |
| 2014/0299331 | A1 | 10/2014 | Hart et al. |
| 2016/0003004 | A1 | 1/2016 | Inglis et al. |
| 2021/0222550 | A1* | 7/2021 | Fripp ..................... H04B 11/00 |
| 2021/0293119 | A1* | 9/2021 | Rogers .................... E21B 23/00 |
| 2021/0324710 | A1* | 10/2021 | Mair ..................... E21B 34/102 |
| 2021/0363859 | A1* | 11/2021 | Inglis ...................... E21B 34/10 |
| 2021/0381326 | A1* | 12/2021 | Inglis ...................... E21B 34/10 |
| 2022/0341285 | A1* | 10/2022 | Werkheiser ............. E21B 34/08 |
| 2023/0094715 | A1 | 3/2023 | Wang et al. |
| 2024/0191619 | A1 | 6/2024 | Fouda et al. |
| 2024/0192398 | A1 | 6/2024 | Fouda et al. |

* cited by examiner

FIRE ON DEMAND BARRIER VALVE USING WIRELESS SIGNAL TRANSMISSION AND SPRING-FORCED PISTON

CROSS-REFERENCE TO RELATED APPLICATION

The present application claims priority to U.S. Provisional Application No. 63/537,121, filed Sep. 7, 2023, the entire disclosure of which is incorporated herein by reference.

BACKGROUND

Wellbores are often drilled through subterranean formations for hydrocarbon exploration and recovery. Well completion involves various downhole procedures prior to allowing production fluids to flow thereby bringing the well online. Valves may be installed downhole to perform a variety of different functions. For example, valves may be installed downhole to form a barrier, isolating a section of the subterranean formation and/or wellbore. In some instances, the downhole valve may be used to isolate one downhole section of the wellbore from another downhole section of the wellbore such that the integrity of a downhole tubular (e.g., casing, liner, etc.) can be tested. In other instances, the downhole valve may be used to isolate a target reservoir from other sections of the wellbore, for example, to isolate the target reservoir while an upper completion is being installed. In yet other instances, the downhole valve may be used to isolate sections of the wellbore for flow control.

Wireline tools have been used for actuation of the downhole valves. However, multiple wireline intervention trips into the wellbore may be needed to open/close the downhole valve from the wellbore, adding unnecessary expense to wellbore operations. Drawbacks to hydraulic control lines are the need for a control line connection from the surface to the downhole valve, which may be problematic when crossing packers and upper/lower completions. Downhole valves have also been actuated from the surface with a hydraulic control line. Techniques have also been implemented for sending pressure signals from the surface to actuate downhole valves. These techniques typically rely on a pressure signal sent from the surface to transition the downhole valve to a different configuration. Drawbacks to pressure signals are repeated pressure signals (e.g., up to 20 cycles or more) may need to be sent to the downhole valve for actuation, which may take undesirable rig time to accomplish.

BRIEF DESCRIPTION OF THE DRAWINGS

These drawings illustrate certain aspects of some of the embodiments of the present disclosure and should not be used to limit or define the disclosure.

DETAILED DESCRIPTION

Figure 1:
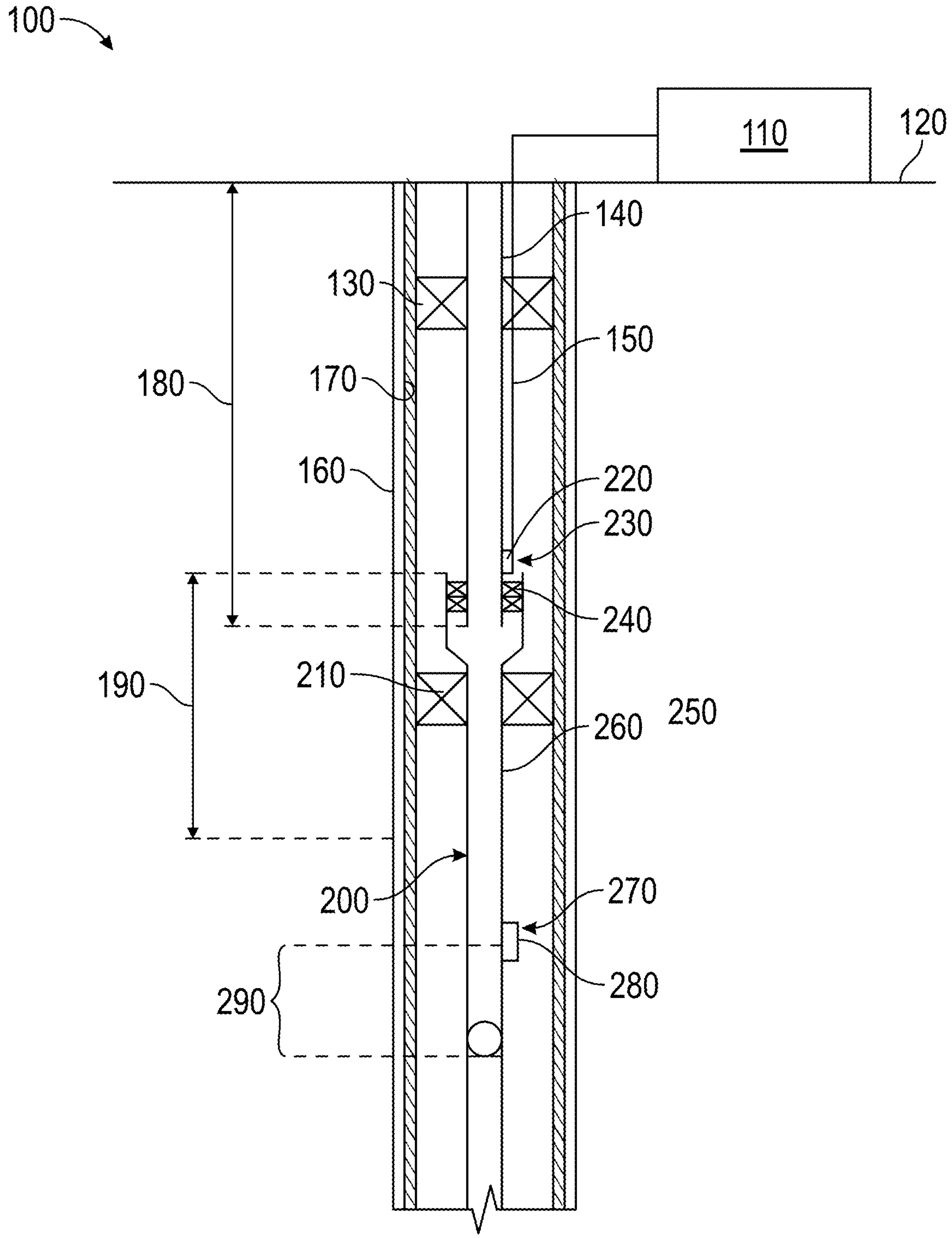
FIG. 1 illustrates a wellbore system including actuation of a downhole tool in accordance with some embodiments of the present disclosure.

Embodiments herein provide a method of actuating a downhole tool, comprising the steps of providing a conductor having a first end positioned at a surface location and a second end positioned at a first downhole location within a wellbore, receiving an electrical signal from the conductor at the first downhole location, transmitting an acoustic signal through the wellbore, starting at the first downhole location and arriving at a second downhole location, receiving the acoustic signal at the second downhole location, moving a spring-forced piston in response to the acoustic signal, and actuating the downhole tool from a first configuration to a second configuration by moving the piston.

Embodiments herein provide wherein the downhole tool is a downhole valve, the first configuration is a closed valve and the second configuration is an open valve. Embodiments herein provide wherein the downhole tool is a downhole valve, the first configuration is an open valve, and the second configuration is a closed valve. Embodiments herein provide wherein the step of transmitting an acoustic signal is performed by transmitting the acoustic signal through a packer. Embodiments herein provide monitoring acoustic signals over time to establish a detected acoustic signal profile. Embodiments herein provide comparing the detected acoustic signal profile to a target acoustic signal profile and performing the actuating step only when the detected acoustic signal matches a target acoustic profile. Embodiments herein provide wherein the acoustic signal is a sound wave. Embodiments herein provide utilizing a hydraulic boost assembly to perform the actuating step.

Embodiments herein provide a system for actuating a downhole tool comprising a tubular string extending from a surface location through a first downhole location to at least a second downhole location, a conductor extending from the surface location to the first downhole location, an acoustic signal transmitter at the first downhole location that is electrically coupled to the conductor, an acoustic signal receiver at a second downhole location that is downhole from the first downhole location, wherein the signal receiver is configured to receive acoustic signals from the acoustic signal transmitter, a decoder at the second downhole location in electrical communication with the signal receiver, a spring-forced actuator at the second downhole location in electrical communication with the decoder, and a downhole tool at the second downhole location coupled to the spring-forced actuator.

Embodiments herein provide a hydraulic boost assembly which builds pressure from a cycling of well fluid pressures. Embodiments herein provide an upper completion seal placed between the first downhole location and the second downhole location. Embodiments herein provide wherein the hydraulic boost assembly stores hydraulic pressure within a chamber holding compressible fluid. Embodiments herein provide wherein the hydraulic boost assembly comprises a low pressure chamber and a high pressure chamber in fluid communication through a check valve.

Embodiments herein provide a system for actuating a downhole tool comprising a tubular string extending from a surface location through a first downhole location to at least a second downhole location, a conductor extending from the surface location to the first downhole location, a acoustic signal transmitter at the first downhole location that is coupled to the conductor and adapted to transmit an acoustic signal down the tubular string, a signal receiver at a second downhole location that is downhole from the first downhole location, wherein the signal receiver is configured to receive acoustic signals from the acoustic signal transmitter which are transmitted through the conductor, a signal decoder at the second downhole location in signal communication with the signal receiver, an actuator at the second downhole location in signal communication with the signal decoder, a latch connected to the actuator which releases a spring-forced piston when a specific signal is received at the signal decoder, a hydraulic boost assembly which applies additional force to the spring-forced piston in addition to the spring force, and a downhole tool at the second downhole location coupled to the spring-forced piston.

Embodiments herein provide a pin pusher within the actuator that travels towards a barrier member. Embodiments herein provide wherein a fracturing of the barrier member establishes fluid communication between a fluid chamber and a relief chamber. Embodiments herein provide an upper completion seal placed in between the acoustic signal transmitter and the signal receiver. Embodiments herein provide a relief piston in the actuator that moves once there is fluid communication established between the fluid chamber and relief chamber.

Embodiments herein provide wherein movement of the relief piston releases a latch inside the actuator. Embodiments herein provide wherein the hydraulic boost assembly comprises a high-pressure chamber filled with a compressible fluid, a low-pressure chamber filled with the same compressible fluid and placed in fluid communication with the high-pressure chamber through a check valve, and a balance piston placed for movement in response to changes in well fluid pressure.

Disclosed herein are methods and systems for remotely transitioning a downhole tool 290 between different operational configurations. Example embodiments disclosed herein include methods and systems for actuating downhole tools 290 (e.g., downhole valves, such as a ball valve) with a wired signal transmitted from a surface 120 location to a first downhole location 230 then an acoustic signal transmitted from the first downhole location 230 to a second downhole location 270. In some embodiments, the acoustic signal may be transmitted through one or more tubulars 200 installed in the wellbore.

100 Wellbore system
110 Control system
120 Surface
130 Upper completion packer
140 Upper tubular
150 TEC line
160 Wellbore
170 Casing string
180 Upper completion
190 Lower completion
200 Tubular string
210 Lower completion packer
220 Acoustic signal transmitter
230 First downhole location
240 Upper completion seal
250 Subterranean formation
260 Lower tubular
270 Second downhole location
280 Actuation system
290 Downhole tool
300 Acoustic signal receiver
310 Decoder
320 Battery
330 Pin pusher
340 Atmospheric chamber
350 Fluid chamber
360 Atmospheric piston
370 Barrier member
375 Latch assembly
380 Latch
390 Valve body
395 Spring assembly
400 Spring
420 Piston
425 Ball valve mechanism
430 Ball valve assembly
435 Ball valve
440 Hydraulic boost assembly
450 Well fluids
460 Low pressure chamber of compressible fluid
470 Hydraulic components
480 High pressure chamber of compressible fluid
490 Piston seal
500 Balance Piston In accordance with present embodiments, a system may be provided that remotely transitions a downhole tool 290 between different operational configurations. The system may include a control system 110 at the surface. The control system 110 may send an electrical signal through a tubing encapsulated cable ("TEC") line 150 (or other suitable electrical conductor) from an electrical signal transmitter within the control system 110 (any type) to a first downhole location 230. The TEC line 150 may include an armor shell, at least one inner insulator disposed in the armor shell, and at least one electrical conductor disposed within the at least one insulator. The armor shell may include a metal tubing (e.g., stainless steel, alloys of stainless steel) for protection of the at least one electric conductor. The acoustic signal transmitter 220 may receive a signal from one or more electrical conductors inside the TEC line 150 and convert the signal to an acoustic signal (or pulse, pattern, frequency, amplitude, or some combination of these) that is then transmitted downhole to a second downhole location 270, sometimes through a sealing element and/or packer(s). The acoustic signal may be any frequency and amplitude of a sound pressure wave that could be either audible or inaudible. A target acoustic profile may be generated and stored so that the acoustic signal can later be received and decoded and compared to said target acoustic profile.

An actuation system 280 located at the second downhole location 270 may include a signal receiver or sensor 300 that listens for some type of acoustic signal sent through the TEC line 150. The acoustic signal receiver 300 may be powered, for example, by a battery 320 or other suitable means. The actuation system 280 may be coupled to a downhole tool 290, which may be a downhole valve. The actuation system 280 receives the acoustic signal, which may be command to trigger the downhole tool 290 to a different configuration (ie. to open or close the downhole valve). In some embodiments, the actuation system 280 triggers a downhole valve to open.

In some embodiments, the actuation system 280 triggers a downhole valve to close. For example, the actuation system 280 may release a spring 400 to push down and rotate open the ball mechanism of the downhole valve. In some embodiments, the spring 400 opening may be assisted by a hydraulic boost assembly.

FIG. 1 illustrates a wellbore system 100 from a surface 120 location through a subterranean formation 250. The wellbore system 100 includes a plurality of wellbore tools interconnected to form a tubular string extending through a casing string 170 that is cemented in as wellbore 160. The wellbore system 100 includes a control system 110 at the surface 120. The downhole system further includes an upper completion 180 and a lower completion 190. A TEC line 150 extends from the control system 110 to an acoustic signal transmitter 220 in the upper completion 180 at a first downhole location 230. The lower completion 190 includes an actuation system 280 and a downhole tool 290.

Even though FIG. 1 depicts the well system in a specific well environment, it should be understood by those skilled in the art that the well system may be used in a variety of different well environments. For example, the well system includes a specific completion with upper 180 and lower 190 completions, but it should be understood that the well system may be used in wellbores that are completed in a different manner. By way of further example, even though FIG. 1 depicts a vertical section of a wellbore, it should be understood by those skilled in the art that disclosed embodiments may be used in wellbore having other configurations including slanted wells, deviated wells, horizontal well or wells having lateral branches. Accordingly, it should be understood by those skilled in the art that the use of directional terms such as above, below, upper, lower, upward, downward, left, right and the like are used in relation to the illustrative embodiments as they are depicted in the figures, the upward direction being toward the top of the corresponding figure and the downward direction being toward the bottom of the corresponding figure. While the wellbore 160 is shown as being cased, the well system may be used in wellbores that are uncased or include uncased sections.

The well system 100 includes a control system 110 at the surface 120. The control system 110 may also include a data acquisition system to receive signals from the wellbore 160, such as pressure and temperature signals, among others. The control system 110 may instruct the downhole tool 290 located in the wellbore 160. The control system 110 may also receive and process signals from surface 120 and/or downhole sensors (not shown). Control system 110 may present to an operator desired operational parameters and other information via one or more output devices, such as a display, a computer monitor, speakers, lights, etc., for example, which may be used by the operator to control the wellbore operations.

Control system 110 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the control system may be a personal computer, a network storage device, or any other suitable device and may vary in size, shape, performance, functionality, and price. The control system may include random access memory (RAM), one or more processing resources such as a central processing unit (CPU) or hardware or software control logic, ROM, and/or other types of nonvolatile memory. Additional components of the control system may include one or more disk drives, one or more network ports for communication with external devices as well as various input and output (1/0) devices, such as a keyboard, a mouse, and a video display. The control system may also include one or more buses operable to transmit communications between the various hardware components. Control system may also include models and may process data according to programmed instructions and respond to user commands entered through an input device.

The well system may include an upper 180 and lower 190 completion. The terms 'lower completion' and 'upper completion' are used to describe separate completion stages that are fluidly coupled or in fluid communication with the next completion stage to allow production fluid to flow. While not shown, the well system 100 may also include one or more intermediate completions between the upper and lower completion. In some embodiments, the lower completion 190 refers to the portion of the wellbore that is across the production or injection zone and which comprises perforations in the case of a cemented casing such that production flow can enter the inside of the production tubing such that production fluid can flow towards the surface. Generally, the completion stages may be run-in with valves open (e.g., downhole valve) and then the valves are subsequently closed by mechanical or other means such that the completion stages can be isolated from each other, as desired, for example, for fluid loss control, pressure testing, etc.

The tubular string 200 preferably extends through the upper completion 180. In the upper completion 180, the tubular string 200 may include an upper tubular 140, which may include one or more pipes or other conduits. The upper completion 180 may include an upper completion packer 130 that forms a seal between the upper tubular 140 and the casing string 170 (or other outer tubular). The upper completion 180 may also include a upper completion seal 240 (or other seal assembly) that forms a seal between the upper completion 180 and the lower completion 190. As illustrated here, the upper completion seal 240 may form a seal between the upper tubular 140 of the upper completion 180 and a lower tubular 260 of the lower completion 190. While the upper completion seal 240 is shown, example embodiments may be non-sealing without a seal between the upper and lower completions.

The upper completion 180 further includes an acoustic signal transmitter 220 at a first downhole location 230. As illustrated, the acoustic signal transmitter 220 may be positioned in the wellbore 160 and coupled to an exterior surface of the upper tubular 140. A TEC line 150 may extend from the surface 120 to the acoustic signal transmitter 220. As illustrated, the TEC line 150 may extend from the control system 110 to the acoustic signal transmitter 220. The control system 110 may send an electrical signal to the acoustic signal transmitter 220 through the TEC line 150. In some embodiments, the TEC line 150 may be attached to the upper tubular 140. In some embodiments, the TEC line 150 may be run on an exterior surface of the upper tubular 140. In other embodiments (not shown), the TEC line 150 may be run on an interior surface of the upper tubular 140.

The tubular string 200 may extend from the upper completion 180 to the lower completion 190. In the lower completion 190, the tubular string 200 may include a lower tubular 260, which may include one or more pipes or other conduits. The lower completion 190 may include a lower completion packer 210 that forms a seal between the lower tubular 260 and the casing string 170 (or other outer tubular). As illustrated, the lower tubular string 260 may be located proximate to the intersection of the upper and lower completions.

The lower completion 190 may further include an actuation system 280 and a barrier valve. The actuation system 280 and the barrier valve may both be located at a second downhole location 270. The actuation system 280 may be attached to the lower tubular 260. As illustrated, the actuation system 280 may be positioned in the wellbore and coupled with the lower tubular 260. In some embodiments, the actuation system 280 may be attached to an exterior surface of the lower tubular 260. In some embodiments, the actuation system 280 may be housed in a sidewall of the lower tubular 260. The actuation system 280 may be coupled to the downhole valve. The actuation system 280 may be used to operate the downhole tool 290 which may include a valve. The actuation system 280 receives the signal, which may be a command to open/close the downhole valve and triggers the downhole tool 290 to transition to a different configuration. In some embodiments, a downhole valve may be configured to provide a complete blockage of flow through the tubular string 200, e.g., in the form of a ball valve assembly 430 including a ball valve 435. In some embodiments, the ball valve assembly 430 including a ball valve 435 is configured to provide a restriction through the tubular string 200, e.g., in the form of an adjustable choke. In still other embodiments the ball valve assembly 430 including a ball valve 435 may be configured as a circulation valve arranged to selectively direct fluid between an interior and exterior of the tubular string 200.

Figure 2:
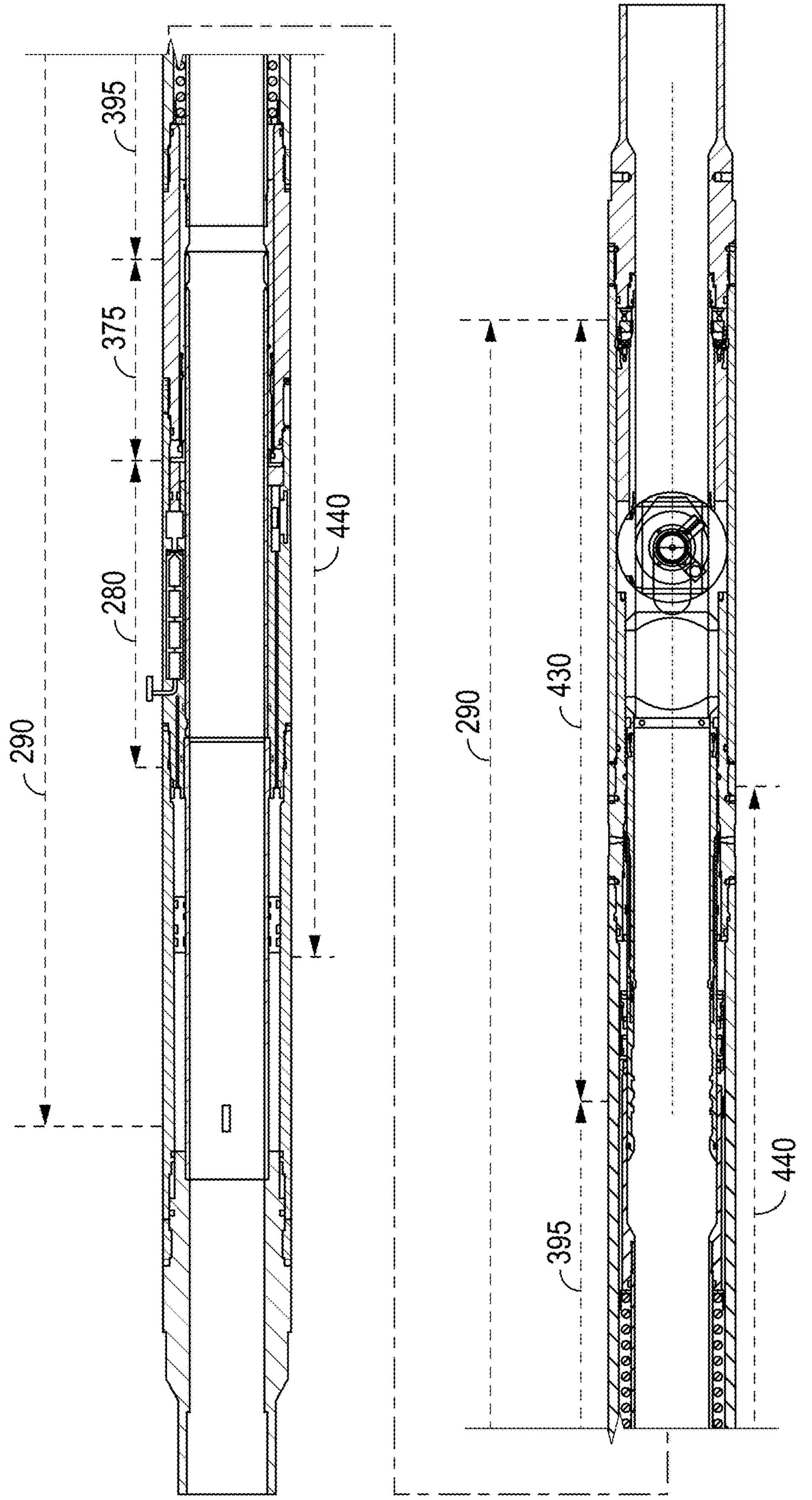
FIG. 2 illustrates a sectional view of a downhole tool in accordance with some embodiments of the present disclosure.

FIG. 2 illustrates a sectional view of a downhole tool 290 in accordance with some embodiments of the present disclosure. In this embodiment, the downhole tool 290 includes an actuation system 280 which connects to a latch assembly 375. A spring assembly 395 may be placed in between the latch assembly 375 and a ball valve assembly 430. Also for this embodiment, a hydraulic boost assembly 440 is used and will be described further below.

Figure 3:
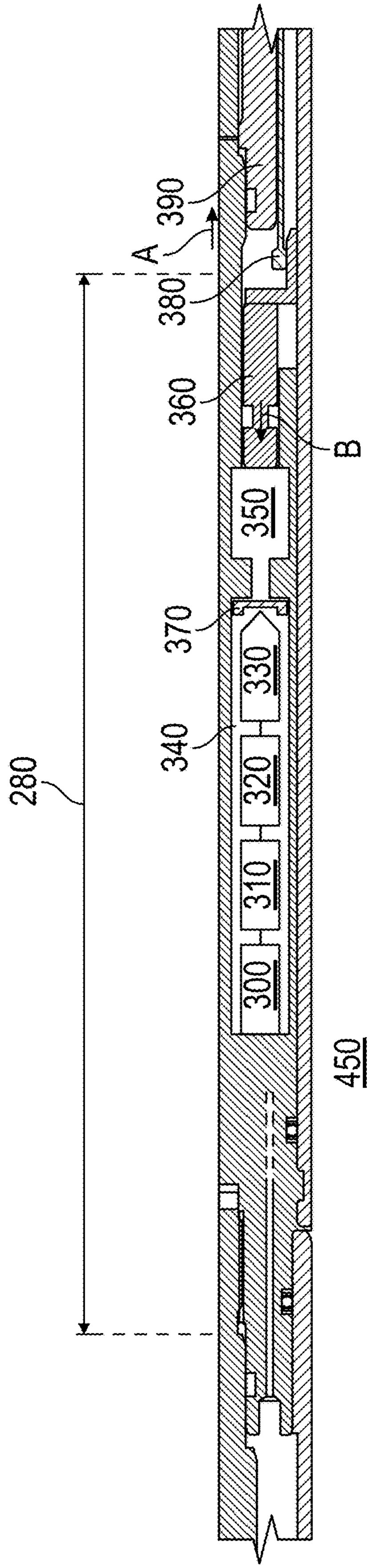
FIG. 3 illustrates a sectional view of an actuation system in accordance with some embodiments of the present disclosure.

FIG. 3 illustrates a sectional view of an actuation system 280 in accordance with some embodiments of the present disclosure. Here the acoustic signal receiver 300 may be positioned to receive acoustic signals sent by the acoustic signal transmitter 220. A battery 320 may be electrically connected to both the acoustic signal receiver 300 and a decoder 310 which may be positioned to trigger a pin pusher 330 in response to receiving a certain signal, pattern, or combination of both from the acoustic signal receiver 300.

The actuation system 280 may be operable for transitioning downhole wellbore tools 290 (e.g., downhole valves such as ball valves) between distinct operational configurations. In some embodiments, the actuation system 280 may be generally housed in a sidewall of the of the tubular string 200 and includes a acoustic signal receiver 300. The acoustic signal receiver 300 may be operable to receive electric signals, convert or decode these signals with a decoder 310. The decoder 310 is operable to decode the acoustic signal into an electronic instruction to thereby determine whether the actuation system 280 should be triggered to transition the downhole tool 290 between operational configurations. Any suitable decoder may be used. In some embodiments, the decoder 310 includes an electronic circuit including various components such as a microprocessor, a digital signal processor, random access memory, read only memory and the like that are programmed or otherwise operable to recognize the predetermined target acoustic profile and to thereby determine whether actuation system should be operated. When the decoder 310 identifies a match between the signal values received and the target signal profile, the decoder 310 may issue a command to an actuation mechanism, such as a pin pusher 330, which triggers the transitioning of the downhole tool 290 (ex, valve) between operational configurations as discussed in greater detail below. The pin pusher 330 may comprise a linear motor, pneumatic piston, or similar mechanism. The decoder 310 may also include timing devices to delay or control the time period between detection of the target acoustic profile and issuing the command to the pin pusher 330. The acoustic signal receiver 300, the decoder 310, and the pin pusher 330 may all be operably coupled to a battery 320 or another downhole power source to receive power therefrom. In some embodiments, the battery 320 may be rechargeable.

The actuation system 280 further includes a piston 420 that is coupled to a force from the spring 400. In the illustrated embodiments, the piston 420 is slidably disposed in a sidewall of the tubular string 200, which may also be the valve body 390. The spring 400 has a spring force in the first direction (shown by arrow "A") that may be applied to the piston 420 thus making the piston 420 spring-forced in some embodiments. An upper end of the piston 420 may include a latch 380. The latch 380 may be positioned between the outer and inner portions of the valve body 390. The latch 380 releasably secures the piston 420 in place by a projection on the outer of the valve body 390. Displacement of the piston 420 in the first direction may be substantially prevented by the latch 380. Upon release of the latch 380, the spring force from spring 400 and the hydraulic pressure force from the high pressure chamber 480 causes the piston 420 to move downward in the first direction causing the downhole tool 290 to change configurations, in some embodiments this causes a valve to open. The compressible fluid (for example silicone oil) that is contained within the high pressure chamber 480 expands as the piston 420 moves in a direction parallel to the axis of the wellbore so as the tool 290 transitions from one position to another position (ex. as a valve opens or closes in some cases) the spring force generated by spring 400 reduces and the hydraulic pressure force from the high pressure chamber 480 reduces as well.

A barrier member (eg burst disc) 370 is secured between the fluid chamber 350 and an atmospheric chamber 340 which the pin pusher 330 is disposed. In some embodiments, the fluid chamber 350 is filled with a fluid e.g. hydraulic oil. Barrier member 370 initially prevents actuator fluid from escaping from the fluid chamber 350 into the atmospheric chamber 340. Barrier member 370 is illustrated as a disk member and can be formed from a metal but could alternatively be made from a plastic, a composite, a glass, a ceramic, a mixture of these materials, or other material suitable for initially containing actuator fluid in fluid a chamber, but selectively failing in response to the target acoustic profile being identified by the decoder 310, and the command being issued to the pin pusher 330. In the illustrated embodiment, the pin pusher 330 advances a pin in the atmospheric chamber 340 toward the barrier member 370 to thereby fracture the barrier member 370. In other embodiments, failure of the barrier member 370 may be selectively induced by other types of actuation mechanisms configured to induce failure of the barrier member 370 by chemical reactions, combustion, mechanical weakening or other degradation of barrier member 370. Failure of the barrier member 370 creates an opening in the barrier 370 and establishes fluid communication between the fluid chamber 350 and the atmospheric chamber 340. Actuator fluid may thus exit the fluid chamber 350 and enter the atmospheric chamber 340, which allows the atmospheric piston 360 to be urged toward the fluid chamber 350 in a second direction (shown by arrow B) by the pressure differential between the atmospheric chamber 340 and the high pressure chamber 480. Movement of the atmospheric piston 360 releases the latch 380 of the piston 420.

In some embodiments during operation, acoustic signal receiver 300 detects an acoustic signal, for example, from the acoustic signal transmitter 220 (e.g., shown on FIG. 1) and provides acoustic values to the to the decoder 310 over time. The decoder 310 monitors the acoustic values and determines whether the acoustic values over a particular time interval match the target acoustic profile saved in the decoder 310. If the decoder 310 identifies the acoustic profile in the acoustic values received, and thereby determines that the actuation system 280 should be operated, the decoder 310 issues a command to the pin pusher 330 to advance the pin. For example, the decoder 310 may route electrical power from the battery 320 to the pin pusher 330, immediately or after an appropriate delay, to allow the pin pusher 330 to operate to induce a failure of the barrier 370. Failure of the barrier 370 creates an opening in the barrier and establishes fluid communication between the fluid chamber 350 and the atmospheric chamber 340. Hydraulic fluid may thus exit the fluid chamber 350 and enter the atmospheric chamber 340, which allows the atmospheric piston 360 to be urged toward the fluid chamber (arrow B) by pressure acting on atmospheric piston 360 area from the compressed fluid contained in the high pressure chamber 480. Movement of the atmospheric piston 360 releases the latch 380 causing the piston 420 to be urged in a first direction (arrow A) by spring 400. Pressure from the piston 420 and tubing exert a force causing the tool 290 to operate or in some embodiments for a valve to open.

Figure 4:
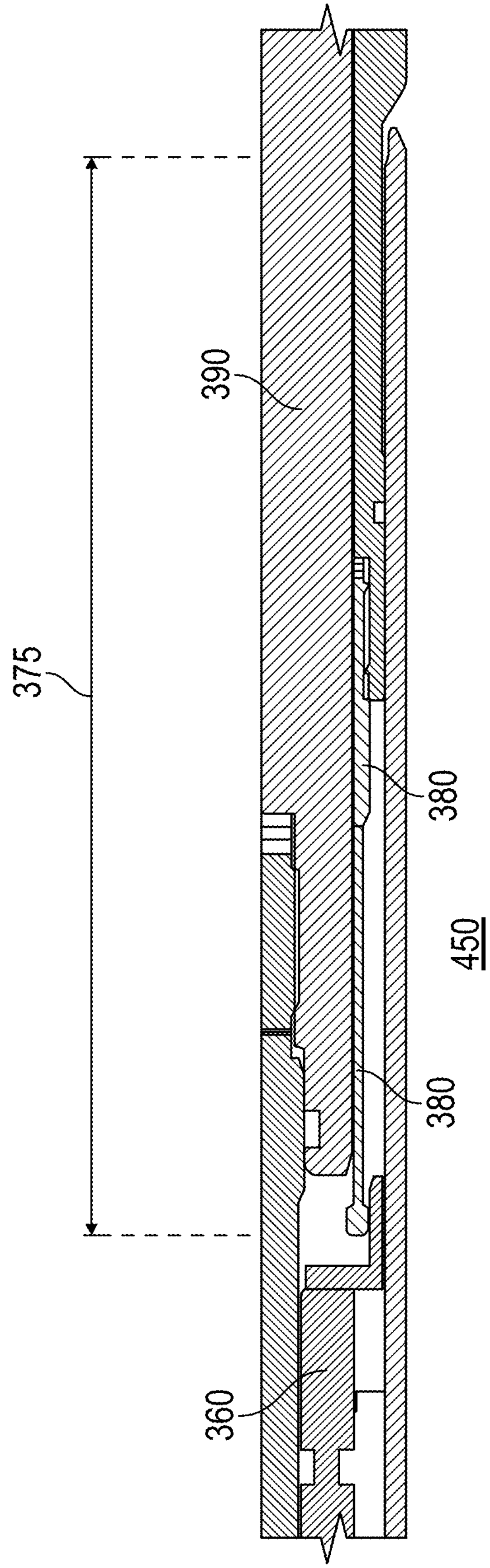
FIG. 4 illustrates a sectional view of a latch assembly in accordance with some embodiments of the present disclosure.

FIG. 4 illustrates a sectional view of a latch assembly 375 in accordance with some embodiments of the present disclosure. As described further below, the latch 380 may be actuated once the actuation system 280 is triggered.

Figure 5:
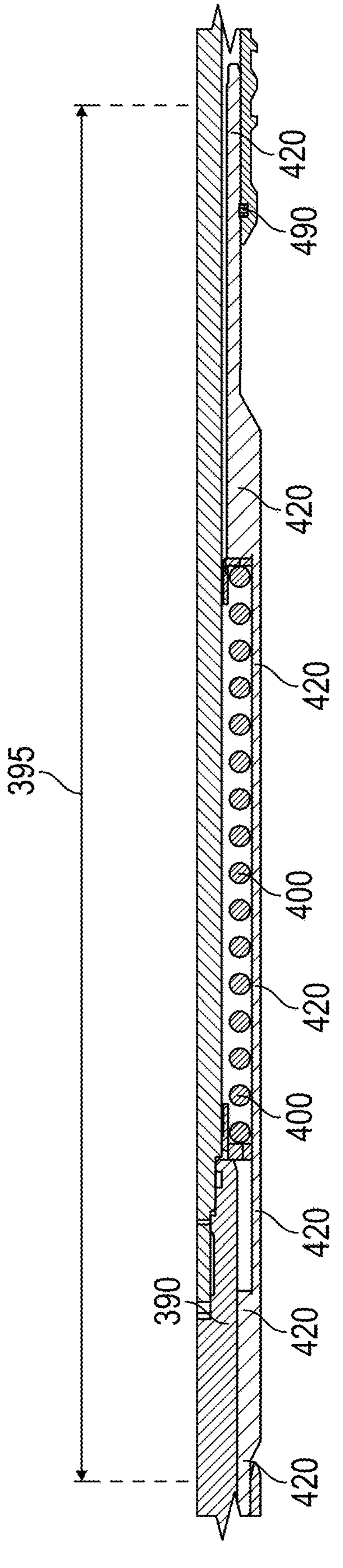
FIG. 5 illustrates a sectional view of a spring assembly in accordance with some embodiments of the present disclosure.

FIG. 5 illustrates a sectional view of a spring assembly 395 in accordance with some embodiments of the present disclosure. Here, one or more springs 400 may be used to apply a horizontal force to the latch 380.

Figure 6:
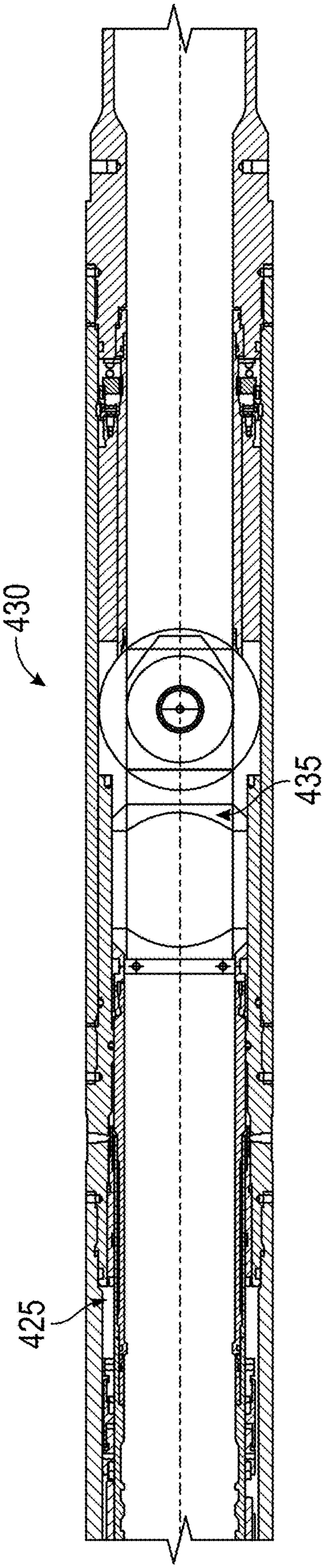
FIG. 6 illustrates a sectional view of a ball valve assembly in accordance with some embodiments of the present disclosure.

FIG. 6 illustrates a sectional view of a ball valve assembly 430 in accordance with some embodiments of the present disclosure where said ball valve assembly 430 can be actuated by movement of the latch 380 to engage with a ball valve 435.

Figure 7:
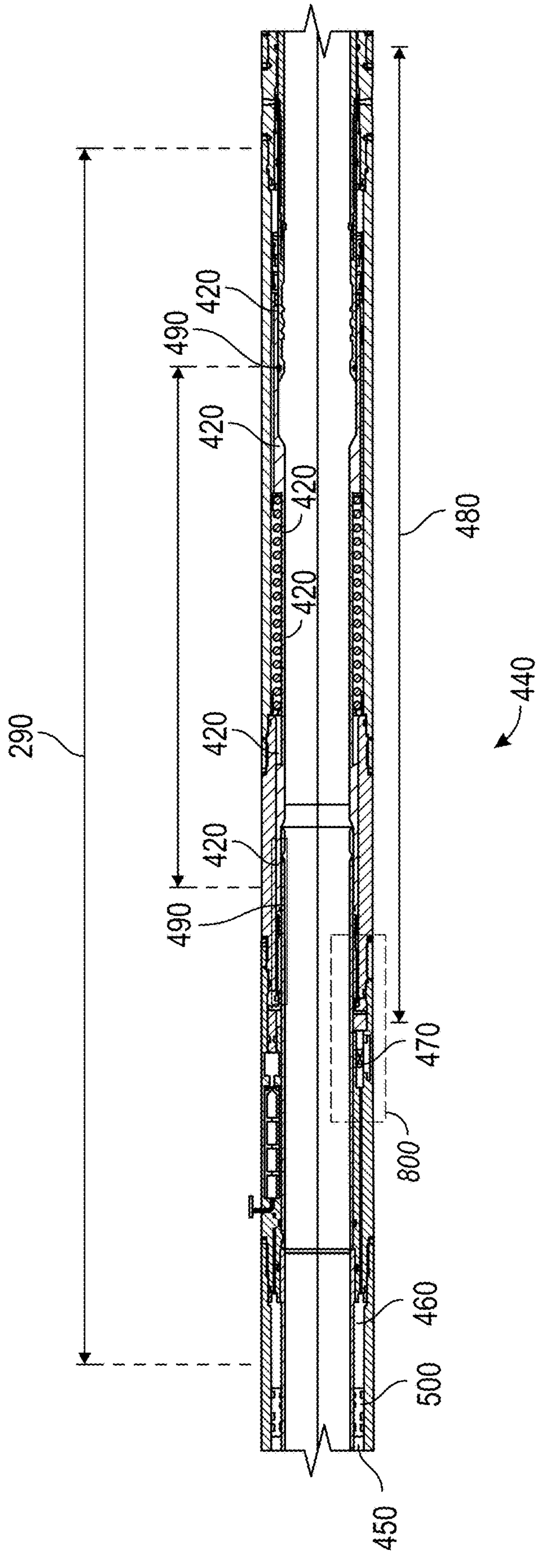
FIG. 7 illustrates a sectional view of a hydraulic boost assembly in accordance with some embodiments of the present disclosure.
Figure 8:
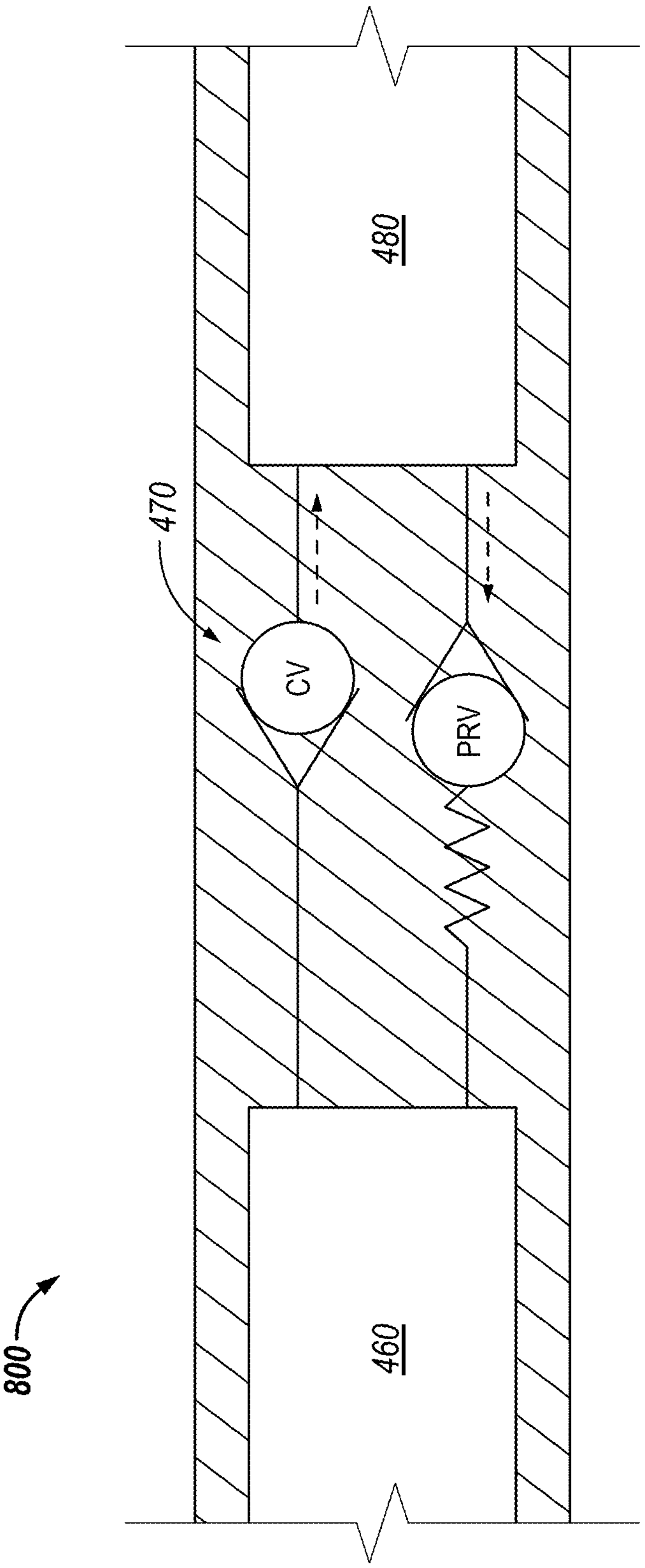
FIG. 8 illustrates a sectional view of the hydraulic components in accordance with some embodiments of the present disclosure.

FIG. 7 illustrates a sectional view of an optional hydraulic boost assembly 440 in accordance with some embodiments of the present disclosure. Well fluids 450 may be located at the above-hole position of the tool 290 and are fluid sealed off from a low pressure chamber 460 by a balance piston 500 which may contain a compressible fluid (preferably silicone oil but many other compressible fluids would work with the embodiments herein). The low pressure chamber 460 may be placed in fluid communication with a high pressure chamber 480 located downhole of the low pressure chamber 460. The low pressure chamber 460 may be placed in fluid communication with a high pressure chamber 480 through one or more hydraulic components 470. A first hydraulic component 470 may be a check valve which provides a fluid communication between the two chambers but only allows the flow of fluid from the low pressure chamber 460 into the high pressure chamber 480.

A second (optional) hydraulic component 470 may be a pressure relief valve in fluid communication with the high pressure chamber 480 and the low pressure chamber 460 which would automatically trigger at a high pressure threshold, for example near 3,000 psi in some embodiments. In this embodiment, if the pressure in the high pressure chamber 480 continues to build due to for example an increase in temperature and the pressure in the high pressure chamber 480 becomes too high, the pressure relief valve within the hydraulic components 470 may be used to release some portion of compressible fluid from the high pressure chamber 480 back into the low pressure chamber 460. The high pressure chamber 480 also may contain the same compressible fluid as stored in the low pressure chamber 460. Thus, the hydraulic boost assembly 440 creates an additional force with the hydraulic pressure built and stored within the high pressure chamber 480, which may be rapidly expelled in order to provide an additional force (in addition to the spring force from spring 400) on the latch 380 of the piston 420. The additional force is generated from the trapped high pressure chamber fluid acting on a piston area defined by the piston 420 which is located between the two piston seals 490.

During standard well operations many different pressure applications are conducted e.g. testing to make sure the barrier valve is closed, to set a packer, to test the integrity of the upper and/or lower completion etc. The hydraulic boost feature works by capturing any applied pressure to the well bore fluids 450 and storing it by compressing the compressible fluid in the high pressure chamber 480. This is important because it means no multiple pressure cycles or dedicated pressure signal need be applied to charge the hydraulic boost function. The pressure can be built up over these cycles and utilized when desired, without the need to have a large electrical signal, pulse, or battery to create a large force. The hydraulic boost gives a benefit because it enhances the available opening force by combining the additional hydraulic pressure stored in the high pressure chamber 480 to the mechanical spring force generated by the spring.

The hydraulic boost assembly 440 and its related subcomponents are not required to practice any embodiment of the invention. It has only been provided as a unique system and method for building pressure within a chamber for later use, if needed.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A method of actuating a downhole tool, comprising the steps of:

providing a conductor having a first end positioned at a surface location and a second end positioned at a first downhole location within a wellbore;

receiving an electrical signal from the conductor at the first downhole location;

transmitting an acoustic signal through the wellbore, starting at the first downhole location and arriving at a second downhole location;

receiving the acoustic signal at the second downhole location; and actuating a downhole tool from a first configuration to a second configuration by moving a spring-forced piston in response to the acoustic signal using at least in part a hydraulic boost assembly comprising a low pressure chamber, a check valve, a high pressure chamber, and a pressure relief valve, wherein the check valve provides fluid communication only from the low pressure chamber to the high pressure chamber, wherein the pressure relief valve is in fluid communication with the high pressure chamber and releases a compressible fluid from the high pressure chamber to the low pressure chamber when pressure inside the high pressure chamber is above a pressure threshold.

2. The method of claim 1, wherein the downhole tool is a downhole valve, the first configuration is a closed valve and the second configuration is an open valve.

3. The method of claim 1, wherein the downhole tool is a downhole valve, the first configuration is an open valve, and the second configuration is a closed valve.

4. The method of claim 1, wherein the step of transmitting an acoustic signal is performed by transmitting the acoustic signal through a packer.

5. The method of claim 4, further comprising monitoring acoustic signals over time to establish a detected acoustic signal profile.

6. The method of claim 5, further comprising comparing the detected acoustic signal profile to a target acoustic signal profile and performing the actuating step only when the detected acoustic signal matches a target acoustic profile.

7. The method of claim 6, wherein the acoustic signal is a sound wave.

8. The method of claim 1, wherein the hydraulic boost further comprises a balance piston between the low pressure chamber and a well fluid.

9. A system for actuating a downhole tool comprising:

a conductor extending from a surface location to a first downhole location;

an acoustic signal transmitter at the first downhole location that is electrically coupled to the conductor;

an acoustic signal receiver at a second downhole location that is downhole from the first downhole location, wherein the signal receiver is configured to receive acoustic signals from the acoustic signal transmitter;

a decoder at the second downhole location in electrical communication with the signal receiver;

a spring-forced actuator at the second downhole location in electrical communication with the decoder;

a hydraulic boost assembly comprising a low pressure chamber, a check valve, a high pressure chamber, and a pressure relief valve, wherein the check valve provides fluid communication only from the low pressure chamber to the high pressure chamber, wherein the pressure relief valve is in fluid communication with the high pressure chamber and releases a compressible fluid from the high pressure chamber to the low pressure chamber when pressure inside the high pressure chamber is above a pressure threshold;

and the downhole tool at the second downhole location coupled to the spring-forced actuator.

10. The system of claim 9, wherein the hydraulic boost assembly builds pressure from a cycling of well fluid pressures.

11. The system of claim 9, further comprising an upper completion seal placed between the first downhole location and the second downhole location.

12. The system of claim 10, wherein the hydraulic boost assembly stores hydraulic pressure within a chamber holding the compressible fluid.

13. A system for actuating a downhole tool comprising:

a tubular string extending from a surface location through a first downhole location to at least a second downhole location;

an electrical conductor extending from the surface location to the first downhole location;

an acoustic signal transmitter at the first downhole location that is coupled to the conductor and adapted to transmit an acoustic signal down the tubular string;

a signal receiver at a second downhole location that is downhole from the first downhole location, wherein the signal receiver is configured to receive acoustic signals from the acoustic signal transmitter which are transmitted through the electrical conductor;

a signal decoder at the second downhole location in signal communication with the signal receiver;

an actuator at the second downhole location in signal communication with the signal decoder;

a latch connected to the actuator which releases a spring-forced piston when a specific signal is received at the signal decoder;

a hydraulic boost assembly which applies additional force to the spring-forced piston in addition to the spring force, wherein the hydraulic boost assembly comprises a low pressure chamber, a check valve, a high pressure chamber, and a pressure relief valve, wherein the check valve provides fluid communication only from the low pressure chamber to the high pressure chamber, wherein the pressure relief valve is in fluid communication with the high pressure chamber and releases a compressible fluid from the high pressure chamber to the low pressure chamber when pressure inside the high pressure chamber is above a pressure threshold; and the downhole tool at the second downhole location coupled to the spring-forced piston.

14. The system of claim 13 further comprising:

a pin pusher within the actuator that travels towards a barrier member.

15. The system of claim 14 wherein:
a fracturing of the barrier member establishes fluid communication between a fluid chamber and a relief chamber.

16. The system of claim 13 further comprising:
an upper completion seal placed in between the acoustic signal transmitter and the signal receiver.

17. The system of claim 15 further comprising:
a relief piston in the actuator that moves once there is fluid communication established between the fluid chamber and relief chamber.

18. The system of claim 17 wherein:
movement of the relief piston releases the latch connected to the actuator.

19. The system of claim 13, wherein:
the hydraulic boost assembly further comprises a balance piston placed for movement in response to changes in well fluid pressure.

20. The system of claim 13, wherein the acoustic signals from the acoustic signal transmitter are audible.

* * * * *